United States Patent [19]

Taylor et al.

[11] Patent Number: 5,007,006
[45] Date of Patent: Apr. 9, 1991

[54] METHOD OF AND APPARATUS FOR CALIBRATION OF MACHINES

[75] Inventors: Benjamin R. Taylor, Trelleck; Mark A. V. Chapman; Jeffrey Graham, both of Wotton-Under-Edge, all of United Kingdom

[73] Assignee: Renishaw plc, Gloucestershire, England

[21] Appl. No.: 264,968

[22] PCT Filed: Mar. 7, 1988

[86] PCT No.: PCT/GB88/00167
§ 371 Date: Oct. 25, 1988
§ 102(e) Date: Oct. 25, 1988

[87] PCT Pub. No.: WO88/06714
PCT Pub. Date: Sep. 7, 1988

[30] Foreign Application Priority Data
Mar. 6, 1987 [GB] United Kingdom ............... 8705301

[51] Int. Cl.⁵ .............................................. G01B 11/00
[52] U.S. Cl. .......................... 364/571.05; 356/358; 356/363; 364/167.01; 364/474.35
[58] Field of Search .................. 73/1 J; 356/2, 358, 356/363; 364/167.01, 474.35, 571.01, 571.04, 571.05, 571.07

[56] References Cited

U.S. PATENT DOCUMENTS

| | | | |
|---|---|---|---|
| 3,654,446 | 4/1972 | Gordon et al. | 364/571.05 |
| 4,128,794 | 12/1978 | Burleson | 318/603 |
| 4,195,412 | 4/1980 | Llop et al. | 33/227 X |
| 4,378,160 | 3/1983 | Vlad et al. | 356/358 |
| 4,628,441 | 12/1986 | Johnstone et al. | 364/474.35 X |
| 4,710,865 | 12/1987 | Higomura | 364/167.01 |
| 4,792,228 | 12/1988 | Haffner | 356/364 X |
| 4,819,195 | 4/1989 | Bell et al. | 364/474.35 X |

FOREIGN PATENT DOCUMENTS

| | | |
|---|---|---|
| 3526919 | 7/1985 | Fed. Rep. of Germany . |
| 2000867 | 1/1979 | United Kingdom . |
| 2162942 | 12/1986 | United Kingdom . |

Primary Examiner—Parshotam S. Lall
Assistant Examiner—Edward R. Cosimano
Attorney, Agent, or Firm—Oliff & Berridge

[57] ABSTRACT

A method of and apparatus for dynamically calibrating a machine are disclosed in which a laser interferometer is provided in addition to the machine scales for taking independent measurements of a movement of a machine part while the part is in motion. As the moving machine part reaches pre-determined distances along its movement (e.g. every inch) the readings of the interferometer and the machine scales relating to the movement of the machine part are recorded and compared. Any difference is recorded for use in mapping the machine errors. In the preferred form of the invention a reflector is mounted on the machine spindle adjacent to, or in place of, a tool or measuring probe, and its movements are measured by the interferometer. The interferometer is arranged to generate a signal as each predetermined distance is reached and an infra-red signal is transmitted from the interferometer to a receiver on the machine spindle which is wired into the probe or tool detection circuits. This signal initiates reading of the machine scales in the same manner as the probe would normally operate. In this way not only can physical errors in the machine movement be corrected but time delays in the electrical signalling system can be allowed for.

19 Claims, 2 Drawing Sheets

METHOD OF AND APPARATUS FOR CALIBRATION OF MACHINES

BACKGROUND OF THE INVENTION

The present invention relates to a method of, and apparatus for, the calibration of a machine system in which relative movement takes place between two parts of the machine. Examples of such machine systems are co-ordinate measuring machines and machine tools.

Such machines generally have parts movable along three mutually orthogonal axes generally designated x,y and z axes, by means of which tools, which term includes measuring devices such as touch trigger probes, are positioned with respect to a workpiece. The machines include measuring devices for example, scales, positioned along the three axes of the machine, and scale readers which provide a measure of the movement of the movable part of the machine, thus providing a determination of the position of the tool along all three axes. The scales themselves are calibrated during manufacture.

The movable machine parts run in tracks on the fixed parts and errors arise between the actual movement of the movable parts, and the movement indicated by reading the scales. These errors are due, inter alia, to pitch, roll and yaw movements of the machine parts caused for example, by mis-alignments or tolerances in the tracks. There may also be mis-alignment of the scale on its axis or between the scale and scale reader.

It is known from U.S. Pat. No. 3,654,446 to account for machine errors of the sort outlined above, by plotting an error map of the machine. This is achieved according to the patent specification, by moving the movable parts of the machine to a large number of positions within the working envelope of the machine and, at each position once the machine has stopped, recording the counts of the machine scale readers. The actual distances moved by the machine parts along the three orthogonal axes are then independently measured by another measuring device in the form of a laser interferometer. The laser interferometer includes a counter for counting interference fringes produced within the interferometer during movement of the movable parts of the machine. The difference between the measured movements of the movable part of the machine as indicated by the scale reader and the interferometer fringe counter along each axis, are then recorded in analogue or digital form on any suitable recording medium.

While this method can provide useful information for correcting many of the above-mentioned errors, workpieces are usually measured while the machine is in motion, and the above-described method will not take account of any other errors which may be introduced due to movement of the machine.

SUMMARY OF THE INVENTION

It is an object of the present invention to provide a method of, and apparatus for, dynamically calibrating a machine during relative movement of parts thereof.

In accordance with the invention as claimed in the appended claims there is provided in a machine having parts which are relatively movable in three orthogonal directions for positioning a tool relative to a workpiece and having measuring devices positioned between the relatively movable parts for measuring the movements of the parts in said directions, a method of dynamically calibrating the machine comprising the steps of:

mounting interferometric measuring apparatus in relation to the machine for providing a measurement of a movement of a first machine part in at least one of said directions independently of, and in addition to, the measurement being made of said movement by the respective measuring device or devices of the machine, simultaneously initiating at pre-determined intervals during said movement the recording of the measurements of said movement produced by both of the measuring apparatus and the respective measuring device or devices, comparing the two recorded measurements and providing an indication of the difference between them. It is to be understood that the word tool in this context encompasses a measuring probe.

The initiation of the recording of the readings of the interferometric measuring apparatus and the measuring devices of the machine (usually scales and scale readers) may be caused by an independent pulse generator which sends simultaneous signals to the fringe counter of the interferometer and the scale reader at pre-determined intervals, to initiate recording of their instantaneous reading, or by controlling either the interferometer counter or the scale reader so that every time its reading reaches a pre-determined value, a signal is delivered to the other device to initiate recording of its instantaneous reading.

By this means the differences noted between the readings of the machine measuring devices and the interferometer will represent more closely than the method described in said U.S. Pat. No. 3,654,446 the errors present during an actual measuring cycle, and the controlling computer of an automated machine can be programmed to display a corrected scale reading calculated taking into account the measured errors.

Also according to the invention there is provided apparatus for dynamically calibrating a machine having parts which are relatively movable in three orthogonal directions for positioning a tool relative to a workpiece, and having measuring devices positioned between the relatively movable parts for measuring the movements of the parts in said directions, and wherein the apparatus comprises an interferometric measuring apparatus positioned in relation to the machine for providing a measurement of a movement of a first machine part in at least one of said directions independently of, and in addition to, the measurement being made of said movement by the respective measuring device or devices of the machine, means for simultaneously initiating at pre-determined intervals during said movement the recording of the measurements of said movement produced by both of the measuring apparatus and the respective measuring device or devices, and means for comparing the two recorded measurements and providing an indication of the difference between them.

In a preferred embodiment of the invention the interferometer fringe counter is provided with means for generating a signal every time the count in any given direction reaches a pre-determined number and the signal is sent to the scale reader to initiate recording of instantaneous reading.

Although timing errors in the electronic apparatus are relatively stable and can be separately calibrated, a further preferred feature of the present invention is that the signal from the interferometer is directed to a receiver on the machine spindle on which a measuring probe would normally be fitted. The receiver is arranged to produce a signal similar in nature to the signal generated by a probe during a measuring operation, which is then passed through the existing signal conditioning electronics and machine interface to the scale reader in the same manner as the probe signal. Thus any delays or errors produced by the circuitry between the probe and the scale reader will be included in the error reading produced by the method of the invention.

BRIEF DESCRIPTION OF THE DRAWINGS

Examples of the invention will now be more particularly described with reference to the accompanying drawings in which.

DETAILED DESCRIPTION OF THE PREFERRED EMBODIMENTS

Figure 1:
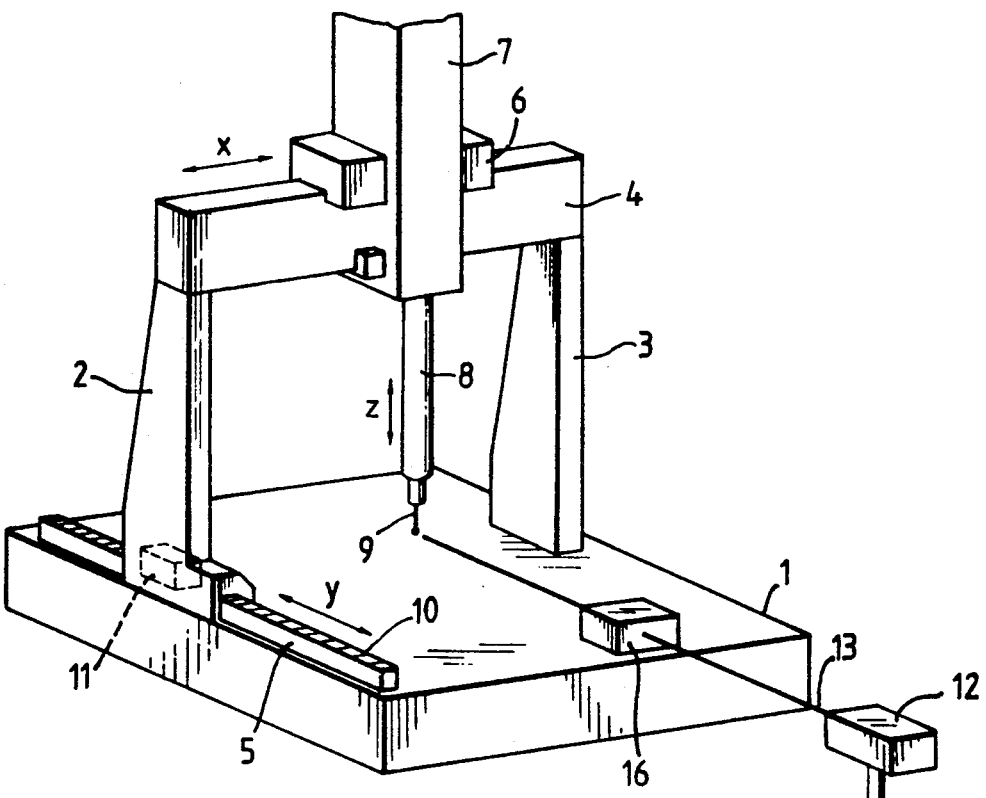
FIG. 1 is an illustration of a co-ordinate measuring machine incorporating an interferometer for carrying out the present invention.

Referring to FIG. 1 there is illustrated co-ordinate measuring machine having a fixed work table 1 on which a workpiece to be measured may be mounted, and a co-ordinate framework including uprights 2 and 3 linked by a cross beam 4. The upright 2 runs on an air bearing on a track 5 and the upright 3 runs on an air bearing on the worktable 1 to provide motion as indicated by the arrow y (denoted the y-axis). The cross beam supports a carriage 6 on air bearings to allow movement of the carriage 6 as indicated by the arrow x (denoted the x-axis). The carriage 6 in turn supports a pillar 7 within which the machine spindle 8 is supported on further air bearings to move as shown by the arrow z (denoted the z-axis). The spindle normally carries a measuring probe 9.

It can be seen therefore that the measuring probe can be positioned anywhere within the working envelope of the machine.

Each of the supports for the moving elements of the machine carries a scale and scale reader which constitute a first measuring device whereby the position of the probe in terms of its distance from a datum point along each of the three axes x,y and z can be determined. Only the scale 10 and scale reader 11 on the y-axis are shown.

A further measuring apparatus in the form of a laser interferometer is mounted in relation to the machine to provide an independent measurement of the movement of the machine spindle 8. As illustrated in FIG. 1 the laser interferometer includes a laser 12 which stands on a support so as to be in a fixed position relative to the machine, and directs a laser beam 13 through an interferometer 16 mounted on the machine table 1 towards the machine spindle 8.

Figure 2:
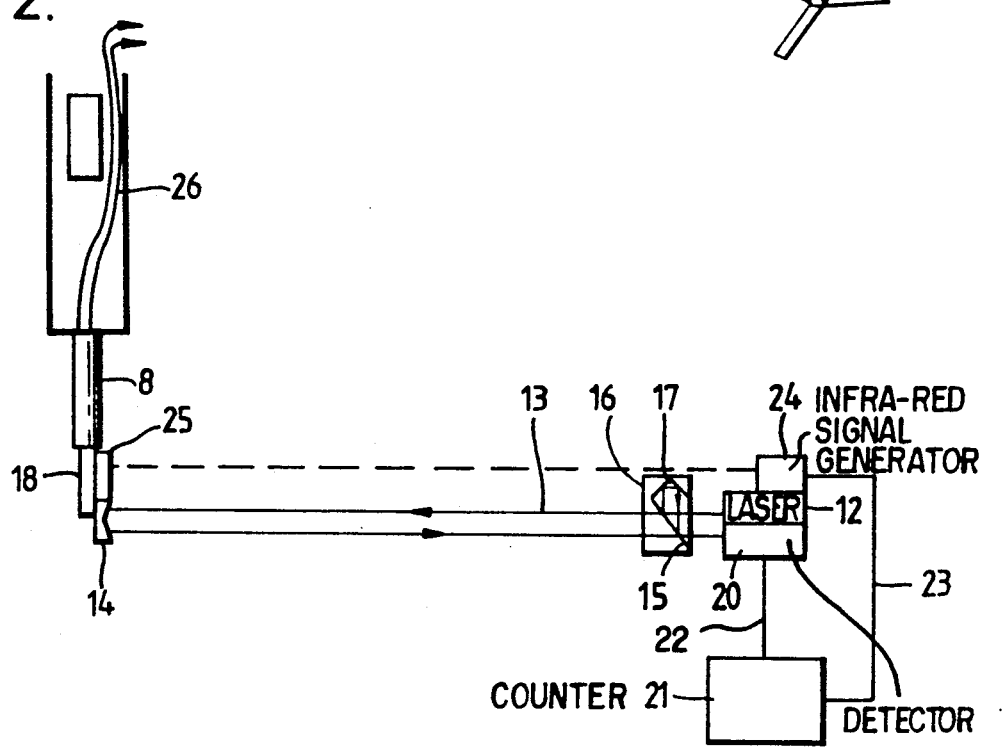
FIG. 2 shows in more detail the interferometer of FIG. 1.

Apparatus for carrying out the method is shown in more detail in FIG. 2.

Referring now to FIG. 2 it can be seen that the interferometer 16 includes a beam splitter 15 which directs a portion of the laser beam 13 to a retro-reflector 17 to form the reference arm of the interferometer, while allowing the remainder of the beam 13 to be transmitted through to a retro-reflector 14 mounted on a special unit 18 mounted on the machine spindle 8. The retro-reflector reflects the laser beam 13 back to the beam splitter 15 where it re-combines with the part of the beam from the reference arm to produce a combined beam. The combined beam is received by a detector 20 which generates pulses from the interference fringes caused by interference of the two parts of the combined beam as the retro-reflector is moved during the calibration process.

The pulses generated by the detector are passed along line 22 to a counter 21 which provides an indication of the distance moved by the retro-reflector. The counter 21 is associated with a signal generating system shown in more detail in FIGS. 3 and 4 for producing a signal to be sent to the machine.

Calibration of the machine takes place as follows.

The machine is traversed along the axis of interest and each time the machine moves a pre-defined interval (e.g. 1 inch) the signal generation system generates an output pulse. This is done by converting the pre-defined distance to a fringe count of the interferometer. The output from the counter is then continuously compared with this fringe count until the two are equal. When this happens an output pulse is generated and the next pre-determined distance is converted to a fringe count. The difference in distance between one pre-defined distance value and the next is the distance interval.

In this way it is possible to generate output pulses at regular pre-defined intervals with very high accuracy as the machine is traversed along the axis. These output pulses are linked into the machine controller to trigger the machine controller to take a reading of the position of the spindle 8 from the scale reader. Error evaluation is then simply a case of comparing the differences between successive readings taken by the machine with the pre-determined distance interval set on the interferometer.

To simplify interfacing the interferometer output pulses to the machine controller a link is made using the existing probe inputs already available on the machine for initiating the recording of the scale reader measurement. This can be done in several ways.

1. The output pulse may be generated in a form which is compatible with the signal normally passed to the machine controller from the probe interface. This signal is connected into the machine instead of the usual interface output signal.

2. The output pulse may be generated in a form which is compatible with the signal normally passed to the probe interface from the probe. This signal is connected into the probe interface instead of the probe signal.

3. The output pulse may be directed to a receiver on a special unit which mounts into the standard fitting on the machine spindle.

The preferred method of linking the output pulses from the interferometer to the machine controller to initiate recording of the scale reader measurement is shown in FIG. 2. Output pulses from the signal generation system are passed along a line 23 to an infra-red signal generator 24 which transmits an infra-red pulse to a receiver 25 forming part of the unit 18. The receiver 25 generates a signal compatible with the signal generated by a probe and sends it along a lead 26 to the existing probe signal conditioning electronics, and then on to the machine controller via the existing probe interface. Upon receipt of the signal the machine controller causes the instantaneous reading of the scale reader to be recorded. For the calibration process the software in the machine controller is modified to prevent the controller stopping the machine on receipt of the signal from the unit 18, which is the normal action on receipt of a probe signal.

The first and second alternative methods 1 and 2 described above for linking the interferometer output pulses to the machine controller would use the same pulse generating system of the interferometer but, in the case of the first alternative, produces the pulse in a form capable of being received directly by the machine controller, either via an infra-red signal receiver on the machine or via cables directly linked to the controller. This method by-passes the probe connection and the probe interface unit. This would provide a distance reading from the scale reader which would be closer to the instantaneous reading of the interferometer but would not take account of the timing uncertainty in the probe electronics and interface.

In the second alternative the pulse generating system of the interferometer generates a pulse capable of being received by the probe interface unit via the receiver 25 as shown in FIG. 2. This method would compensate for timing uncertainty in the interface and the machine controller but not in the probe.

Generation of the distance pulses from the interferometer can be achieved in two ways depending on the rate of travel of the machine parts and the accuracy requirements.

Figure 3:
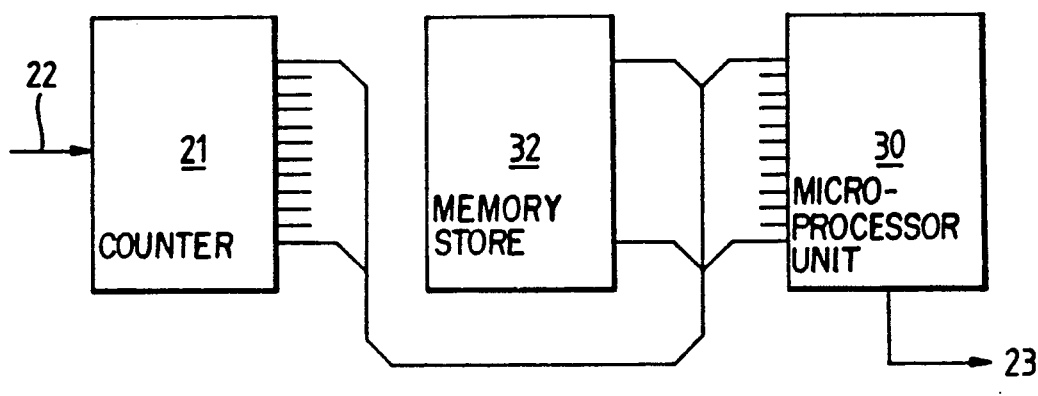
FIG. 3 illustrates in more detail a system for generating the signal required from the interferometer.

FIG. 3 shows an arrangement in which a microprocessor is used to generate the pulses from the interferometer. This arrangement includes a micro-processor unit 30, a memory store 32 and the counter 21 which in this example is an up/down counter. The microprocessor is programmed to convert each pre-defined distance into a fringe count which is stored in the microprocessor memory. The micro-processor then repeatedly reads the output of the up/down counter as the relative movement of the machine parts is taking place and compares it with the stored fringe count until the two are equal (or within a certain tolerance). At this instant the micro-processor generates an output pulse, records the fact that the distance has been achieved and then repeats the process for the next pre-defined distance interval. This method may be used when the machine is being operated at low speed since the comparison is being made by the micro-processor software which is relatively slow. If required a latch device may be associated with the counter 21 to sample and hold the readings of the counter and the micro-processor reads the latched count.

Figure 4:
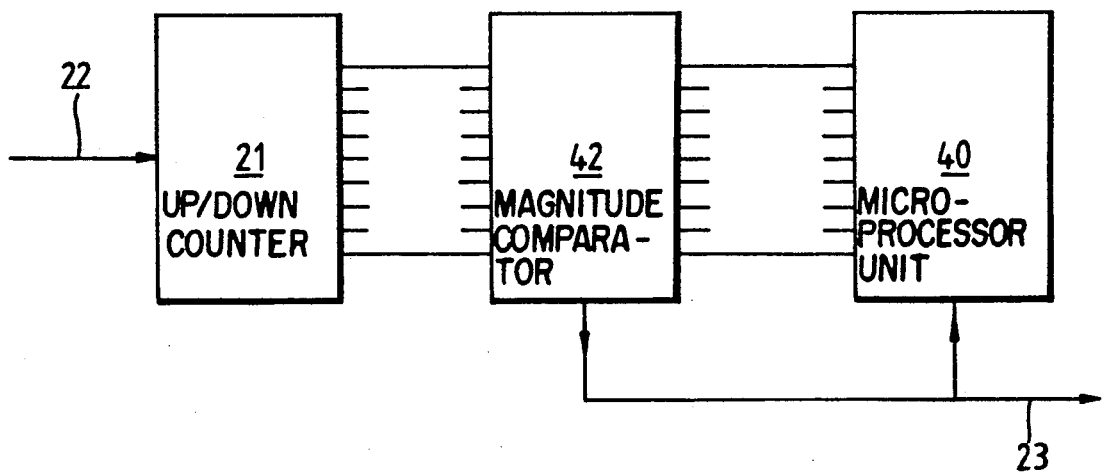
FIG. 4 illustrates an alternative system for generating the signal required from the interferometer.

For high speed operation of the machine the alternative method illustrated in FIG. 4 may be used. For this method the control system includes a micro-processor unit 40, a magnitude comparator 42 and the up/down counter 21. The micro-processor converts each pre-defined distance into a fringe count which is loaded into the magnitude comparator. The magnitude comparator then continuously compares the output of the up/down counter with the fringe count and generates an output pulse when the two are equal and sends a signal to the micro-processor to record the fact that the distance has been reached. The micro-processor then loads the next fringe count into the magnitude comparator. In this method the comparison is being made by hardware in the comparator which is relatively faster than the micro-processor software.

It will be understood the resolution of the measurements can be improved by sub-dividing the fringe count using an interpolating device, the output of which is also used in the comparison process.

Also instead of using distance intervals, time intervals may be used in which case the machine is preferably driven at constant velocity. Further, the intervals may be regular or irregular.

As a further alternative an independent pulse generator may be used to send simultaneous pulses to both the interferometer fringe counter and the scale reader to initiate registering of their readings at pre-determined intervals for comparison of the respective distance measurements and computation of the machine error. The independent pulses may be derived from the microprocessor unit 30 at programmed time intervals, or from the probe which can be arranged to send a signal to the interferometer when it triggers on contact with calibration artefacts i.e. devices of standardised dimensions.

Although the invention has been described with reference to a co-ordinate measuring machine, it will be appreciated that it is equally applicable for the dynamic calibration of machine tools.

The method described above shows how errors on one axis of the machine are measured. It will be understood that all three axes of the machine can be dealt with in the same manner. For a more complete calibration in an automated machine the machine controller can be programmed to move the spindle 8 along the machine diagonals towards or away from the corners of the worktable to give either simultaneous x and y, or simultaneous x,y and z axis measurements. The laser beam is then directed along the diagonal to follow the movement of the spindle. Also by using an angle measuring interferometer rotational errors can be calibrated.

As an alternative to an infra-red beam for signalling the interferometer distance pulses to the machine a fixed wire or other forms of wireless transmission may be used, for example, an ultrasonic, microwave or radio beam.

The errors detected by the method of the invention may be mapped into the memory of the computer controlling the machine so that the computer will generate a corrected reading in operation using the scale reader information and the error map in its memory.

Alternatively where the scale material is writable, for example, a magnetic material, the errors determined by the method of the invention can be written onto the scale itself so that the scale reader can read both the distance moved by the movable part and the error in the reading simultaneously. Such a method is described in our concurrently filed patent application referenced 83GB (UK Patent application No. 8705304).

We claim:

1. A method of dynamically producing an error map of a machine having parts which are relatively moveable and having measuring devices positioned between the relatively movable parts for measuring the movements of the parts, the method comprising the steps of:

mounting interferometric measuring means in relation to the machine for providing a measurement of a movement of a machine part independently of, and in addition to, the measurement being made of said movement by any of the respective measuring devices of the machine;

producing within the interferometric measuring means a continuous fringe count representing said measurement at any instant;

producing and storing fringe counts which equate to pre-determined distance intervals between the relatively movable parts;

comparing the stored fringe counts with the continuous fringe count and generating output signals each time the two are equal;

sending said output signals to the machine to trigger simultaneous recording of the measurements of said movement made by any of the measuring devices of the machine; and comparing the distance intervals between the recorded measurements from the measuring devices of the machine with the predetermined distance intervals between said output signals, and providing an indication of any difference between them as said error map of the machine measurements.

2. A method as claimed in claim 1, wherein the machine has a controller capable of initiating recording of the measurements of the movements of the parts made by said measuring devices, the method further comprising the steps of generating said output signals in a form capable of being received by the controller and sending the output signals to the machine controller to initiate recording of the measurements made by said devices.

3. A method as claimed in claim 1, wherein the machine has a controller capable of initiating recording of the measurements of the movements of the parts made by said measuring devices, and a probe interface for communicating signals from a probe mounted on the machine to the controller, the method further comprising the steps of generating said output signals in a form capable of being received by the probe interface and sending the output signals to the controller via the probe interface to initiate recording of the measurements made by said devices.

4. A method as claimed in claim 3, and further comprising the steps of wirelessly transmitting said output signals from the interferometric measuring apparatus to a receiver mounted on the machine.

5. A method as claimed in claim 4, wherein said output signals is transmitted by an infrared beam.

6. A method of dynamically producing an error map of a machine having parts which are relatively movable and having measuring devices positioned between the relatively movable parts for measuring the movements of the parts, the method comprising the steps of:

mounting interferometric measuring means in relation to the machine for providing a measurement of a movement of a machine part independently of, and in addition to, the measurement being made of said movement by any of the respective measuring devices of the machine, generating signals at predetermined intervals, during a said movement of a machine part, sending said signals to measuring devices of both the interferometric measuring means and the machine to trigger the recording by the measuring devices of the machine and the interferometric measuring means of the respective measurement of said movement, and comparing the respective recorded measurements and providing an indication of any difference between them as said error map of the machine measurements.

7. A calibrating apparatus for use with a machine having parts which are relatively movable and having measuring devices positioned between the relatively movable parts for measuring the movements of the parts, the calibrating apparatus comprising:

interferometric measuring means positioned in relation to the machine for providing a measurement of a movement of a machine part independently of, and in addition to, the measurement being made of said movement by any of said measuring devices, means for generating output pulses at predetermined distance intervals from the measurements of said movement made by said interferometric measuring means, means for sending said output pulses to the machine to trigger simultaneous recording of the measurements of the movement of said moving machine part made by any of the measuring devices of the machine, and means for comparing the distance intervals between the recorded measurements made by the measuring devices of the machine with the predetermined distance intervals between said output pulses, and for providing an indication of any difference between them as an error map of the machine measurements.

8. Apparatus according to claim 7, wherein the means for generating output pulses comprises a fringe counter, a memory store and a micro-processor, the micro-processor being programmed to convert a predetermined distance value into a fringe count which is stored in the memory store, and to compare the fringe count generated by the fringe counter during said movement with the fringe count stored in the memory store and to produce said output pulse to be sent to the machine when the two fringe counts are equal.

9. Apparatus according to claim 7, wherein the means for generating output pulses comprises a fringe counter, a comparator and a micro-processor, the micro-processor being programmed to convert a predetermined distance value into a fringe count which is stored in the comparator, the comparator being arranged to compare the fringe count generated by the fringe counter during said movement, and to produce said output pulse to be sent to the machine when the two fringe counts are equal.

10. Apparatus according to claim 7, wherein the machine further comprises a controller capable of initiating recording of the measurements of the movements of said parts made by said measuring devices, the output pulses are generated in a form capable of being received by the machine controller and are sent to the machine controller to initiate recording of the measurements made by said devices.

11. Apparatus according to claim 10, wherein the means for sending the output pulses from the calibrating apparatus to the machine comprises electrical connections made directly between said apparatus and the machine controller.

12. Apparatus according to claim 7, wherein the machine further comprises a controller capable of initiating recording of the measurements of the movements of said parts made by said measuring devices, and a probe interface for communicating signals from a probe mounted on the machine to the controller, the output pulses are generated in a form capable of being received by the probe interface and are sent to the controller via the probe interface to initiate recording of the measurements made by said devices.

13. Apparatus according to claim 12, wherein a transmitter is provided in association with the interferometric measuring means and a receiver is mounted on the machine whereby said output pulses are wirelessly transmitted from the calibrating apparatus to the machine.

14. Apparatus according to claim 13, wherein the receiver is electrically connected to the probe interface whereby said output pulses are sent to the machine controller via the receiver and the probe interface.

15. Apparatus according to claim 13, wherein the transmitter transmits an infrared beam to the receiver.

16. Apparatus according to claim 13, wherein the receiver is mounted on a device carried by the tool holder of the machine.

17. Apparatus according to claim 16, wherein the device carried by the tool holder also supports a retro-reflector which forms the measuring arm of the interferometric measuring means.

18. Interferometric measuring apparatus for use in calibrating a machine comprising:
- an interferometer for providing a measurement of a movement of a machine part in the form of a number of interference fringes, a detector for detecting the fringes and outputting a pulse signal for each fringe detected, a counter for counting the fringes based upon receipt of each pulse signal from the detector, means for converting a predetermined distance value of said movement into a fringe count, means for comparing said fringe count with the number of fringes counted by the counter, and means for generating a signal for transmission to said machine when the two fringe counts are equal.

19. A calibration device for use with a machine having parts which are relatively movable in three orthogonal directions for positioning a tool relative to a workpiece, and having measuring devices positioned between the relatively movable parts for measuring the movements of the respective parts in said directions, said calibration device comprising:
- interferometric measuring means positioned in relation to the machine for providing a measurement of a movement of a machine part in at least one of said directions independently of, and in addition to, the measurement being made of said movement by any of said measuring devices,
- means for generating from the measurements made by the interferometric measuring means signals corresponding to distance intervals moved by said moving machine part,
- means for transmitting said signals to the machine to initiate recording of the measurements of the movement of said moving machine part made by the measuring devices of the machine, and
- means for comparing the distance intervals between the recorded measurements made by the measuring devices of the machine with the predetermined distance intervals between said output pulses, and for providing an indication of any difference between them as an error map of the machine measurements.

* * * * *